United States Patent [19]
Mazelsky

[11] 3,858,863
[45] Jan. 7, 1975

[54] ROTARY TYPE ENERGY ABSORBER WITH AXIAL DRIVE AND AUTOMATIC RESETTING CAPABILITY

[75] Inventor: Bernard Mazelsky, West Covina, Calif.

[73] Assignee: Ara, Inc., West Covine, Calif.

[22] Filed: Dec. 1, 1972

[21] Appl. No.: 311,297

Related U.S. Application Data

[63] Continuation-in-part of Ser. No. 141,128, May 7, 1971, abandoned.

[52] U.S. Cl. ................... 267/139, 293/70, 293/85, 293/89
[51] Int. Cl. ............................................. F16f 7/08
[58] Field of Search ........ 267/139, 140, 116; 293/1, 293/9, 60, 70, 84, 85, 89; 188/1 C, 129, 130; 114/219

[56] References Cited
UNITED STATES PATENTS
1,570,624  1/1926  Dominguez ......................... 293/70
3,718,326  2/1973  Ristau ............................. 267/140

*Primary Examiner*—James B. Marbert
*Attorney, Agent, or Firm*—Herzig & Walsh

[57] ABSTRACT

A rotary type energy absorber combined with means for converting a linearly acting force into a torque for driving a rotary element of the energy absorber, the linearly acting force being aligned with the axis of the energy absorber. Forces acting on the energy absorber are aligned with its axis, and there are no bending movements introduced. The linearly acting force is converted to a rotary motion by gear means in the form of telescoping threaded members. A spring is provided normally acting upon the device to reset it into an initial position after an impacting force has been received, a clutch being provided to allow free rotation of the energy absorber when being reset.

9 Claims, 7 Drawing Figures

BERNARD MAZELSKY
INVENTOR.

BY Herzig & Walsh
ATTORNEYS

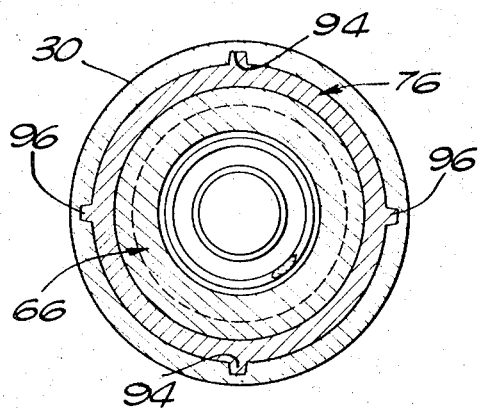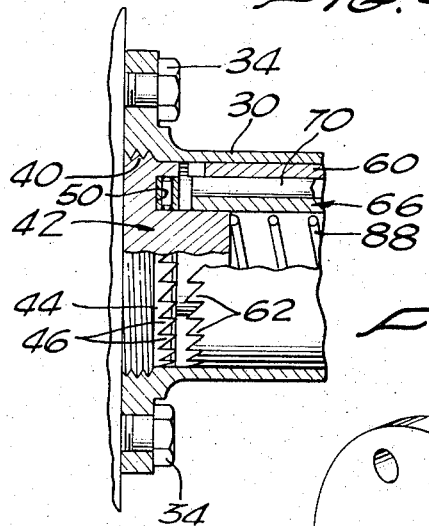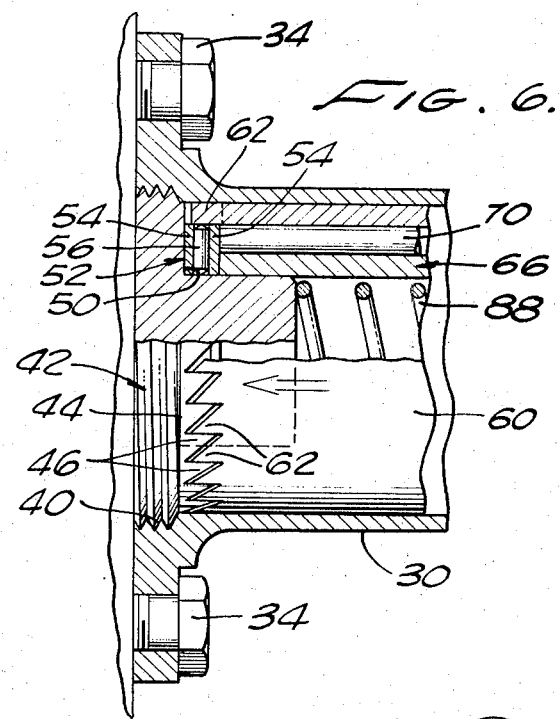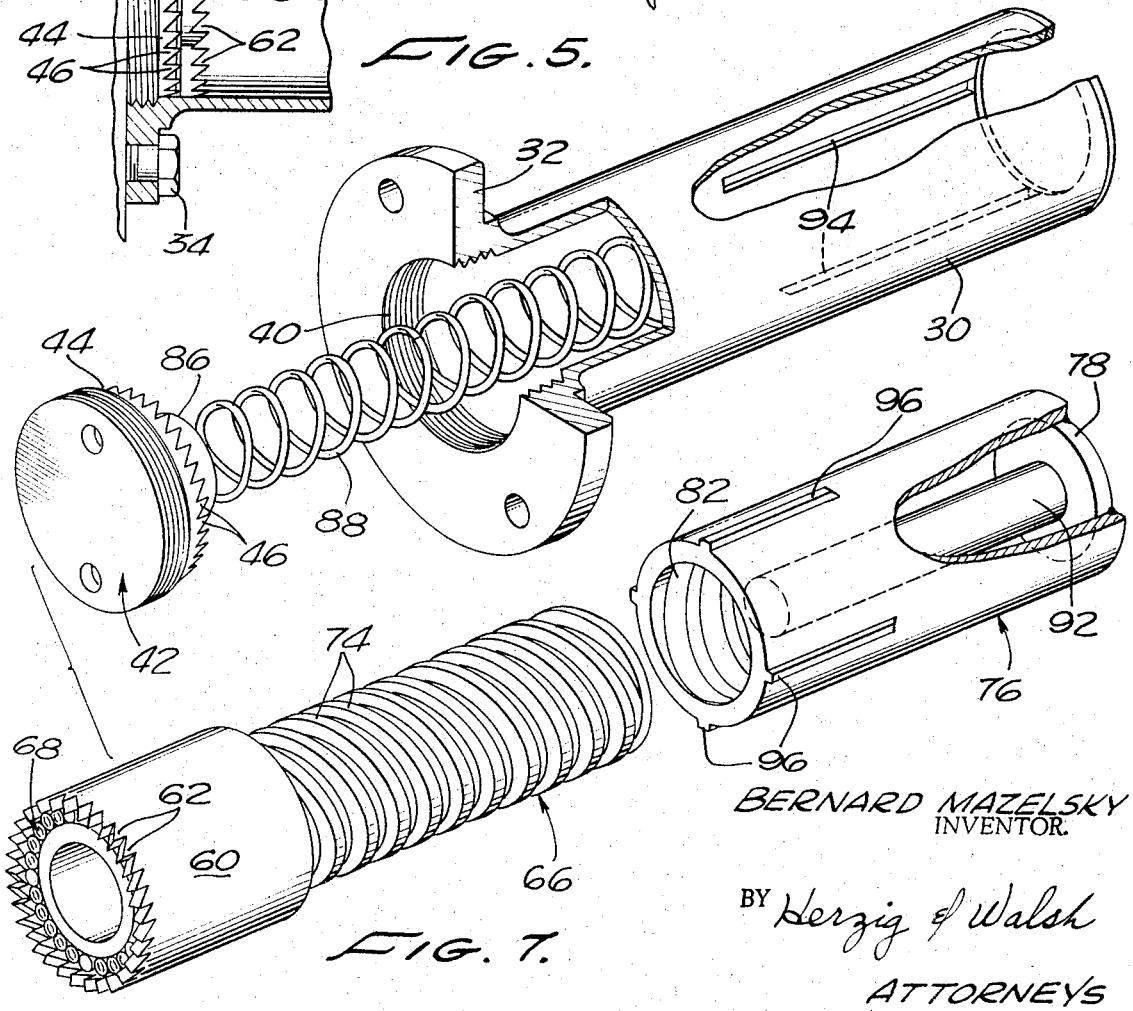

ROTARY TYPE ENERGY ABSORBER WITH AXIAL DRIVE AND AUTOMATIC RESETTING CAPABILITY

This application is a continuation-in-part of Ser. No. 141,128 filed May 7, 1971 and now abandoned.

SUMMARY OF THE INVENTION

The invention relates to energy absorbers and more particularly energy absorbers of the rotary type. The invention embodies an improved mechanism or device wherein a linear acting force to be absorbed is aligned with the axis of the energy absorber and is then converted to a rotary motion for rotating a rotating element of the energy absorber. In addition to this improvement, a further improvement which is of equal or even greater importance is that the energy absorber is one that automatically resets itself to an initial position after having absorbed the forces of an impact. The significance of the improvements will become apparent as the description proceeds.

BACKGROUND OF THE INVENTION

The energy absorbers of the type referred to herein may be of the type shown in U.S. Pat. No. 3,435,919 or 3,635,314 of the herein inventor. The desirability that an energy absorber should have the capability of being reset to an initial position after receiving an impact or absorbing force is apparent. Resetting means have been provided in the past for both linear and rotary type energy absorbers. A rotary type energy absorber having resetting capability is shown in U.S. Pat. No. 3,435,919; and a resettable linear type absorber is shown in U.S. Pat. application Ser. No. 83,788, filed on Oct. 26, 1970, of the herein inventor.

There are many applications for energy absorbers wherein there is a need for absorbing energy acting in a linear direction, a prime example being the combination of linear energy absorbers with vehicle bumpers to absorb impacts. The exemplary form of the invention as described in detail herein is described and illustrated as adapted to a vehicle bumper.

In the prior art, rotary type energy absorbers have been constructed and arranged to receive and absorb linear energy acting in a direction such as to impose bending moments on the energy absorber and to impose a heavy stress load on its mountings. The herein invention provides a new combination of elements wherein the full linear acting force to be absorbed is aligned with the axis of the rotary energy absorber. Means are provided to convert the linear acting motion to rotation around the axis of the energy absorber which then absorbs the energy. The advantages of this arrangement are apparent, particularly in that the forces acting upon the absorber are aligned with its axis and, therefore, symmetrical; and no bending moments or loads are imposed on the absorber or its mountings. The realization of this purpose is a primary object of the invention.

As stated above, a great many applications of energy absorbers involve the absorption of linear acting forces. As stated also, the desirability of the energy absorber having the capability of being reset is apparent. The linear energy absorbers do not adapt themselves to quick and easy means of reset. However, the herein invention embodies the characteristic which is capable of immediate and automatic reset after absorbing energy, and only a spring is required to effect the automatic reset. The realization of this purpose is another primary object of the invention.

In a preferred form of the invention as described in detail herein, the means whereby the linearly axially acting force is converted into rotation takes the form of helical gears which are in the form of telescoping threaded elements, one of which drives a rotary element of the energy absorber. A simple form of automatic clutch is provided between this element of the absorber and the fixed mounting such that whenever the linear acting impacting force terminates or is released, the clutch automatically releases, allowing the entire rotary energy absorber to rotate. Therefore, it is free to be automatically reset by a spring. The realization of this capability in an energy absorber is a further object of the invention.

When a linear axially movable element moves to rotatably drive the energy absorber, a reaction torque is imparted to it. In applications such as that of a vehicle bumper mounted by two energy absorbers, the bumper itself restrains the reaction torque acting on the axially movable element. It is desirable to have the capability of restraining the reaction torque in an application or adaptation where there is only one energy absorber; and the assembly of the herein invention has that capability. Its realization is another object of the invention.

In the preferred form of the invention as described herein, the mounting means for the rotary energy absorber comprises a tubular element; and the axially movable element is preferably tubular and telescoped within the fixedly mounted tubular element. Means are provided between these telescoping members to restrain the reaction torque imparted to the axially movable element so that it does not rotate.

BRIEF DESCRIPTION OF THE DRAWINGS

Further objects and additional advantages of the invention will become apparent from the following detailed description and annexed drawings, wherein:

FIG. 4 is a sectional view taken along line 4—4 of FIG. 2;

FIG. 5 is a partial detail view of the device with the clutch released;

FIG. 6 is a view similar to FIG. 5 with the clutch engaged; and

FIG. 7 is an exploded perspective view of the assembly.

DESCRIPTION OF THE PREFERRED EMBODIMENT

Figure 1:
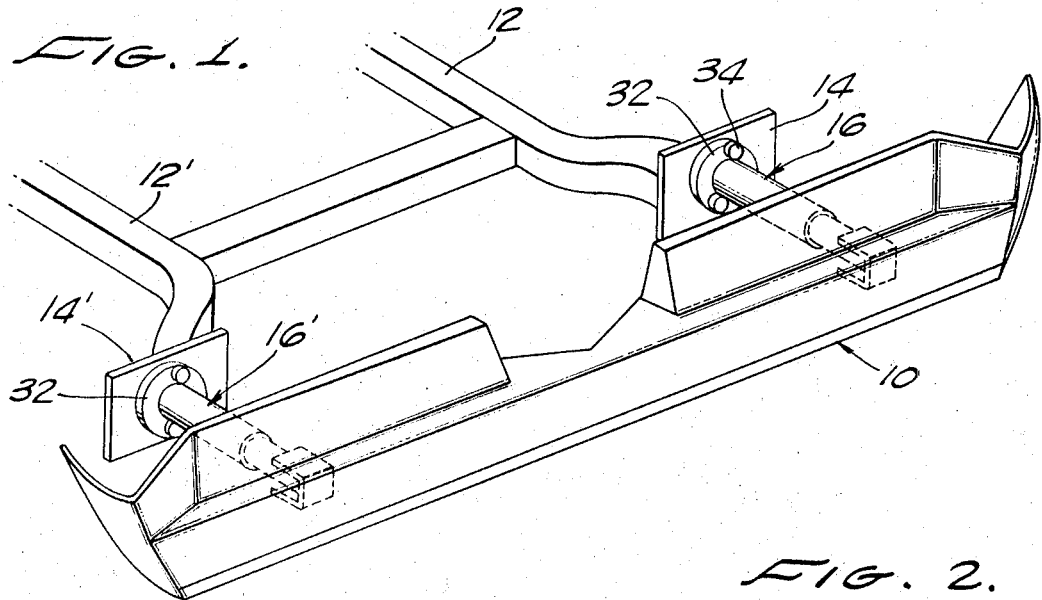
FIG. 1 is a schematic perspective view of a vehicle bumper mounted by way of two of the energy absorber assemblies of the invention.

FIG. 1 of the drawings is a schematic illustration of an installation of a vehicle bumper mounted by way of two of the fully automatically resettable energy absorbers of the invention. The bumper is designated at 10 and may be a typical vehicle bumper. Chassis or frame members are designated at 12 and 12'. Numerals 14 and 14' schematically illustrate mounting plates, and two of the energy absorber assemblies of the invention are designated generally at 16 and 16'.

The energy absorber itself is identified as a whole by the numeral 20, and it may correspond to the rotary type energy absorber of the patents and application previously referred to. The prior patents and application are hereby incorporated herein by reference.

Assembly 16 has pivotal attachment to bumper 10. It has an end cap 78 attached to yoke 24 which is pivotally attached to bumper 10. Numerals 25 and 25' are pivot bolts engaging legs of yoke 24 and extending through inserts 26 and 26' in upper and lower frame parts 27 and 27' of bumper 10 allowing angular or pivotal movement of the bumper as in application Ser. No. 83,789 filed on Oct. 26, 1970, now abandoned.

An impact on the bumper will produce a linear force which, as will be explained, is converted to rotary movement force to be absorbed in the rotary energy absorber. Numeral 30 designates an outer cylinder or cylindrical member having a base part in the form of flange 32 secured to the mounting or support plate 14 by bolts such as shown at 34. Cylinder 30 has a threaded end bore 40. Threaded into the end bore is a threaded end plug 42, the inner part of which as designated at 44 is of smaller diameter. The end face of this part is formed to have ratchet clutch teeth as designated at 46. The inner end face of end plug 42 has a concentric ring shaped groove 50 in it in which is received a needle bearing 52 which will be referred to again presently. The needle bearing is of a conventional type having circular races 54 and 54' with needle bearing members 56 between the races.

The energy absorber, as schematically shown, comprises an outer cylindrical member 60, the end face of which is formed to have ratchet clutch teeth 62 as may be seen in FIGS. 5 and 6 engageable with ratchet teeth 46. The rotary energy absorber has a cylindrical inner member as designated at 66. Between the left end part of inner member 66 and outer member 60 are a plurality of deformable tube elements as designated at 68. Preferably interposed between certain of the tube elements are solid rod members 70. The tube members are squeezed or flattened between the inner and outer members. When there is relative rotation between these members, the tubes roll, stress causing them to undergo plastic deformation, energy being absorbed as already known in the art.

Figure 2:
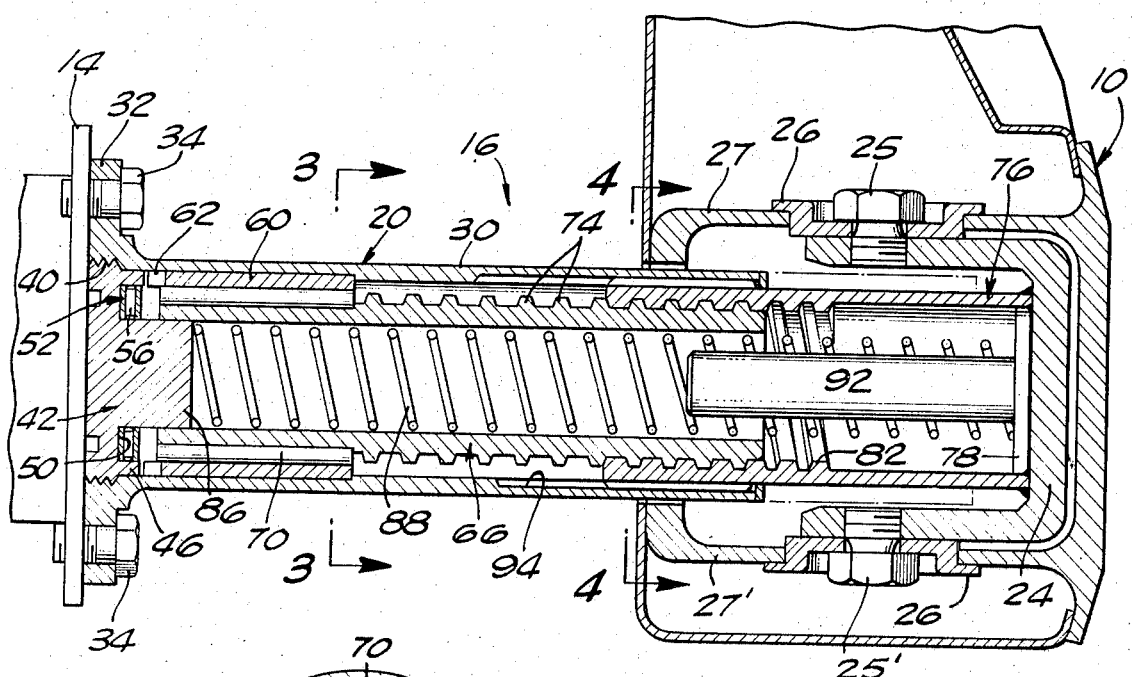
FIG. 2 is a longitudinal cross sectional view of one of the energy absorber assemblies of FIG. 1.
Figure 3:
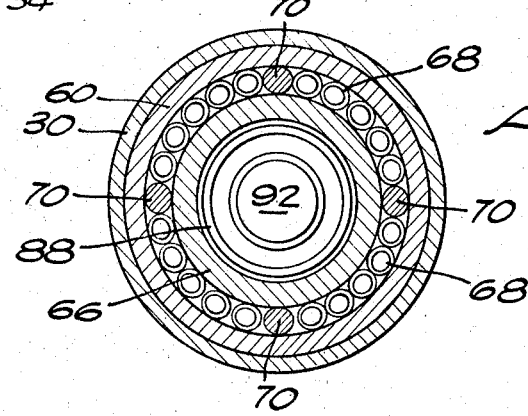
FIG. 3 is a sectional view taken along line 3—3 of FIG. 2.

On the right-hand part of member 66, there is an external helical thread of relatively large pitch as designated at 74. Numeral 76 designates a cylindrical member having an end cap 78 secured thereto, to which yoke 24 is attached. Cylinder 76 telescopes into cylinder 30. It has an internal helical thread 82 of pitch corresponding to that of thread 74. Cylinder 66 telescopes into cylinder 76 as shown in FIG. 2.

End plug 42 has an inner end part 86 of smaller diameter which forms a spring retainer for coil spring 88 within cylinder 66. End cap 78 has an inwardly extending cylindrical member 92 which forms a spring retainer for the other end of spring 88.

Cylinders 30 and 76 are splined together to permit relative axial movement between them but to prevent relative rotation between them. Cylinder 30 is provided with a plurality of axial spline grooves 94 on the inside thereof. Cylinder 76 is provided on the outside with a plurality of axial splines 96 equally angularly spaced. Cylinder 76 may be forced inwardly with respect to cylinder 30 and driven outwardly, but it is prevented from rotating by reason of the engagement which cylinder 30 which is fixedly mounted as described. Cylinder 30 has end flange 97 as shown.

Operation

The operation of the assembly is as follows. Bumper 10 may receive a head-on impact in which both assemblies 16 and 16' would absorb energy, or the bumper may receive an oblique impact, in which event, one of the assemblies would become stressed to absorb energy. In the event of an impact forcing the bumper inwardly, cylinder 76 will be moved axially and linearly inwardly with respect to cylinder 30. The threaded surfaces of cylinders 66 and 76 act in the manner of gears, and the linear axial movement of cylinder 76 inwardly will cause cylinder 66 to rotate. Thus, the inner member of energy absorber 20 rotates relatively to outer member 60 of the energy absorber. The outer member is held against rotation by way of the clutch formed by the interengaging ratchet teeth 46 and 62. The inner end of inner cylinder 66 gears against needle bearing 52 which takes the thrust but allows the cylinder to rotate relatively freely. During the axial movement of cylinder 76, helical spring 88 is compressed to a shorter length. As soon as the impact force terminates or is released, the thrust exerted by inner cylindrical member 66 terminates. Spring 88 acts to urge cylindrical member 76 outwardly as well as urging cylindrical member 66 outwardly. Tubular members 68 being frictionally squeezed between the inner and outer cylindrical members of the energy absorber as a whole will be moved to the right sufficiently to disengage the clutch, that is, ratchet teeth 46 and 62. When this happens, the energy absorber as a whole is now free to rotate. Spring 88 will now quickly return the assembly to battery, that is, the initial normal position of the bumper. The clutch engages at the beginning of any impact upon the bumper.

It will be observed that the actuating forces which are absorbed by the energy absorber are initially linear forces that are converted to rotation. The linear force is axially aligned with the axis of the energy absorber. Thus, the application of force is uniformly symmetrical, not exerting any bending moments on the mounting of the absorber. If cylinders 30 and 76 were not splined together as described, when the assembly is reset, torque would be exerted upon cylinder 76 and on the bumper. With the bumper mounted to the two assemblies, the two assemblies would act to restrain applied torque. Bending moment would be exerted on the bumper at the points of attachment of the energy absorbing assemblies. This is avoided by the splined arrangement whereby the torque exerted on cylinder 76 is restrained by cylinder 30 and its rigid mounting at the left end.

From the foregoing, those skilled in the art will understand the nature and construction of the invention and the manner in which it realizes all of the objectives and advantages as set forth in the foregoing. The assembly has the capability that the energy absorber receives linear thrust which is axial with respect to the absorber. The assembly has the capability of fully automatic reset occurring immediately after the release of the impacting force simply by way of a spring force. This capability of fully automatic reset has great potential in many different commercial applications. The system or assembly readily adapts itself to be designed for any desired load and to have the capability of absorbing linear forces of any magnitude. The disclosure is illustrative, the invention to be accorded the full scope of the appended claims.

What is claimed is:

1. In combination, a rotary type energy absorber comprising: inner and outer cylindrical members having energy dissipating elements between them and adapted to dissipate energy by cyclic plastic deformation; means adapting the energy absorber to absorb the energy of linear forces, said means comprising an axially linearly movable force receiving element having a direction coincident with said axis; and means whereby said axially linear movement imparts rotational movement to one of said members for absorbing energy.

2. The combination as in claim 1, wherein said one member and said axially movable element have interengaging threads.

3. The combination as in claim 2, wherein said one member has an extending cylindrical part, said axially movable element being cylindrical, said part and said axially movable element having telescoping relationship.

4. The combination as in claim 1, including means normally urging said axially movable element in one direction.

5. The combination as in claim 1, including a rigid mounting means for the energy absorber, means providing interengagement between the mounting means and the axially movable element whereby to allow for relative axial movement of the element but to prevent rotational movement of the element whereby the torque to which the axially movable element is subjected is restrained by the mounting means.

6. The combination as in claim 5, wherein said means providing interengagement is in the form of splines between the mounting means and the axially movable element.

7. The combination as in claim 4, wherein said means urging said axially movable element in one direction is constructed to reset the energy absorber after having received an impact.

8. The combination as in claim 3, including clutch means associated with the other of said cylindrical members constructed to allow said other member to freely rotate when the energy absorber is being reset.

9. The combination as in claim 8, wherein said clutch comprises mutually engageable teeth on said other member and on fixed mounting means to restrain rotation of the other member in one direction and to allow it to rotate freely in the opposite direction.

* * * * *